(12) United States Patent
Yoo et al.

(10) Patent No.: US 7,665,110 B2
(45) Date of Patent: Feb. 16, 2010

(54) SYSTEM AND METHOD FOR SYNCHRONOUS REPRODUCTION OF LOCAL AND REMOTE CONTENT IN A COMMUNICATION NETWORK

(75) Inventors: Jea Yong Yoo, Seoul (KR); Woo Seong Yoon, Kyonggi-do (KR); Alexandre Limonov, Seoul (KR); Tae Ho Kim, Seoul (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1409 days.

(21) Appl. No.: 10/425,966

(22) Filed: Apr. 29, 2003

(65) Prior Publication Data

US 2003/0215224 A1    Nov. 20, 2003

(30) Foreign Application Priority Data

May 14, 2002    (KR) ............................... 2002-26575

(51) Int. Cl.
*H04N 7/00* (2006.01)
*H04N 7/16* (2006.01)

(52) U.S. Cl. ..................... 725/52; 725/133; 725/141; 725/153

(58) Field of Classification Search ............... 725/52, 725/133, 141, 153
See application file for complete search history.

(56) References Cited

U.S. PATENT DOCUMENTS

| | | | | |
|---|---|---|---|---|
| 5,828,370 A * | 10/1998 | Moeller et al. | | 715/720 |
| 6,161,132 A | 12/2000 | Roberts et al. | | |
| 6,370,688 B1 * | 4/2002 | Hejna, Jr. | | 725/101 |
| 6,895,171 B1 * | 5/2005 | Taira et al. | | 386/95 |
| 6,934,759 B2 * | 8/2005 | Hejna, Jr. | | 709/231 |
| 7,024,679 B1 * | 4/2006 | Sie et al. | | 725/101 |
| 7,113,694 B2 * | 9/2006 | Kim et al. | | 386/95 |
| 7,139,467 B2 * | 11/2006 | Seo et al. | | 386/95 |
| 2002/0029216 A1 | 3/2002 | Tzou | | |
| 2002/0035601 A1 | 3/2002 | Ullman et al. | | |
| 2002/0035615 A1 | 3/2002 | Ullman et al. | | |
| 2002/0038383 A1 | 3/2002 | Ullman et al. | | |
| 2002/0091799 A1 * | 7/2002 | Katz et al. | | 709/219 |

FOREIGN PATENT DOCUMENTS

| | | |
|---|---|---|
| EP | 0 886 276 A2 | 12/1998 |
| EP | 1 187 423 A2 | 3/2002 |
| JP | 10-285460 A | 10/1998 |

(Continued)

*Primary Examiner*—Christopher Kelley
*Assistant Examiner*—Franklin S Andramuno
(74) *Attorney, Agent, or Firm*—Birch, Stewart, Kolasch & Birch, LLP

(57) ABSTRACT

In accordance with one or more embodiments of the invention, a reproduction engine for reproducing A/V data stored on an interactive DVD comprises a navigator connected to a temporary data storage unit for loading A/V data from the interactive DVD into a first section of the temporary data storage unit, and for loading enhanced data associated with the A/V data into a second section of the temporary data storage unit; a decoder for decoding the A/V data and the enhanced data loaded into the temporary data storage unit; and a presentation engine for reproducing the decoded A/V data and the enhanced data in accordance with control information stored on the interactive DVD.

43 Claims, 5 Drawing Sheets

FOREIGN PATENT DOCUMENTS

| | | |
|---|---|---|
| JP | 2001-148841 A | 5/2001 |
| JP | 2001-521642 | 6/2001 |
| JP | 2002-057990 A | 2/2002 |
| KR | 10-1999-0029476 A | 4/1999 |
| KR | 2000-0017534 | 3/2000 |
| KR | 10-2001-0078135 A | 8/2001 |
| KR | 2001-0103776 A | 8/2001 |
| KR | 10-2001-0086067 | 9/2001 |
| WO | WO-00/63915 | 10/2000 |
| WO | WO-01/98920 A1 | 12/2001 |
| WO | WO-02/05104 A1 | 1/2002 |

* cited by examiner

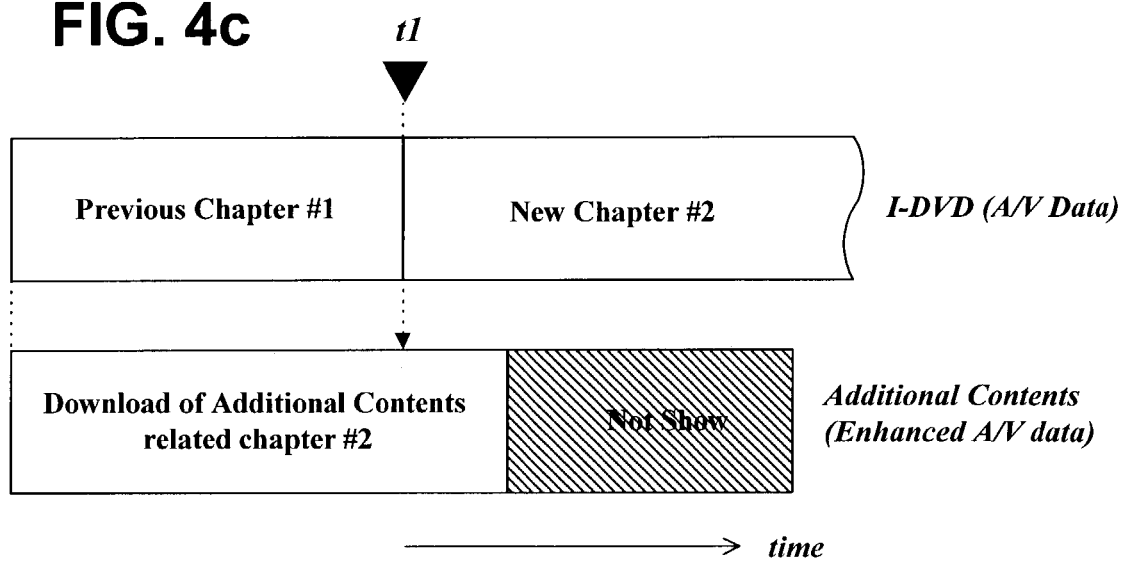
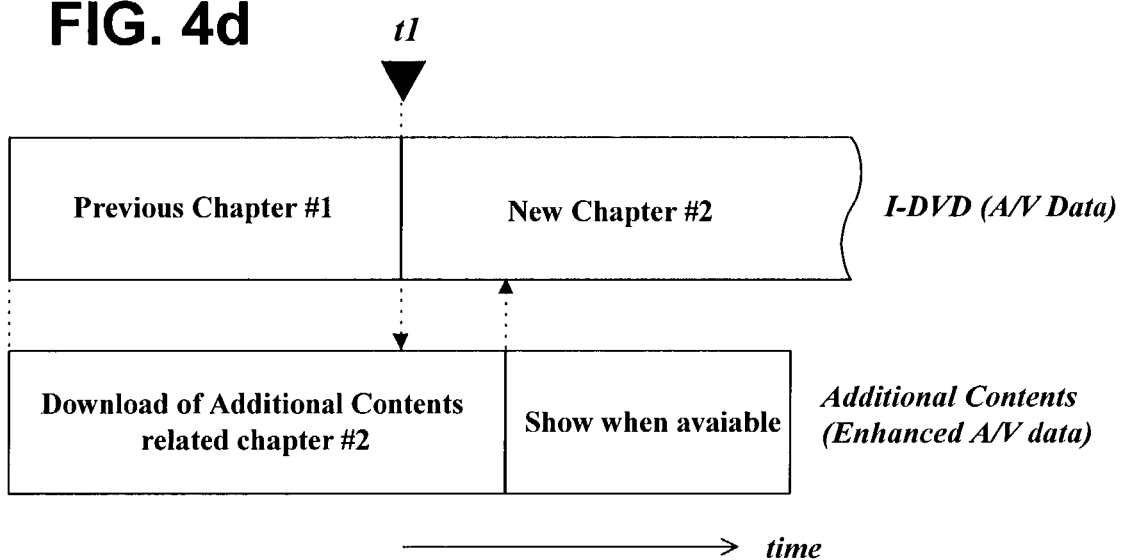

SYSTEM AND METHOD FOR SYNCHRONOUS REPRODUCTION OF LOCAL AND REMOTE CONTENT IN A COMMUNICATION NETWORK

CROSS-REFERENCE TO RELATED APPLICATION

Pursuant to 35 U.S.C. §119(a), this application claims the benefit of earlier filing date and right of priority to the Korean Patent Application No. 2002-026575, filed on May 14, 2002, the content of which is hereby incorporated by reference in its entirety.

BACKGROUND OF THE INVENTION

1. Field of the Invention

The present invention relates to a method and system for reproducing content stored on an interactive disk, and more particularly, to a method and system for synchronizing the reproduction of content stored on an interactive content disk or data storage medium, such as an ENAV (Enhanced Navigation) or I-DVD (Interactive Digital Versatile Disk), with additional navigation or interactive content received from an associated remote content provider on a communication network.

2. Related Art

A high-density optical disk (e.g., a DVD) has very large storage capacity for digital data. The storage capacity of a DVD is sufficient to record high-quality motion picture data of relatively long duration as well as high-quality audio data.

A DVD has two recording areas, one for actual data (e.g., audiovisual or A/V data) and another for control or navigation data used for reproduction control of the recorded actual data. When a DVD is placed into a DVD player, the navigation data is read into a memory first, and then actual data (A/V data) is reproduced with reference to the instructions or control information included in the navigation data. As a result, a user can view a high quality motion picture stored on a DVD using a DVD player.

Recently, an interactive or enhanced navigation (i.e., "I-DVD" or "ENAV") system has been proposed. An interactive content disk (e.g., I-DVD or ENAV disk) can comprise control, navigation or A/V data in form of 'html' (Hyper-Text Markup Language) or 'xml' (EXtensible Markup Language) files. The control data allows an interactive reproduction device (e.g., I-DVD or ENAV player) to reproduce A/V data in accordance with the control and navigation data stored on the interactive content disk.

According to the proposed standards for the enhanced navigation system, since information related with reproduction of A/V data is recorded on a content disk in a read-only format, newer various additional contents or newer presentation forms related with the recorded A/V data can not be added, viewed or accessed. As such, a method is needed to allow newer content or information associated with recorded A/V data to be reproduced in synchronization with the A/V data.

SUMMARY OF THE INVENTION

In accordance with one embodiment of the invention, a method of reproducing information stored on a data recording medium using a reproduction engine connected to a communication network comprises loading first information stored on the data recording medium for reproduction; determining if second information associated with the first information is available on the data recording medium or from a remote content provider connected to the communication network; and reproducing the first information and the second information, in accordance with control information such that the first information is reproduced either during a first period or a second period, wherein the first period is a time period during which the second information is being retrieved and the second period is a time period after the retrieval of the second information is completed.

In some embodiments, the second information is reproduced based on control information stored on the data recording medium. The data recording medium can be an optical disk or an interactive DVD disk. The reproducing of the first information begins after a first portion of the first information is loaded. The first portion of the first information, in one embodiment, comprises approximately all of the first information. In another embodiment, the first portion of the information comprises less than all of the first information, and the system loads the second information while the first information is reproduced.

In one embodiment, the first and second information are loaded into a temporary storage medium divided into at least a first section and a second section, such that the first information is loaded in to the first section and the second information is loaded into the second section of the temporary storage medium.

In a certain embodiment, the first information is reproduced regardless of whether the second information has been loaded. In another embodiment, the second information is not reproduced, unless all the second information is loaded.

Sometimes, the second information is reproduced in along with the first information in real time as the second information is loaded. However, if a first portion of the second information associated with a first portion of the first information is loaded after a first time period has lapsed, then the first portion of the second information is discarded.

In accordance with another embodiment of the invention, the first information may comprise at least first and second portions, and the second information may comprise at least first and second portions respectively associated with the first and second portions of the first information, wherein the first portion of the first information and the first portion of the second information are preloaded, such that said preloaded portions can be played seamlessly before said second portions are loaded.

At least a part of the second portion of the first information is loaded while said preloaded first portions of the first information and the second information are reproduced. In some embodiments, the second portion of the first information is not loaded until the first preloaded portions of the first information and the second information have been substantially reproduced.

Sometimes, the preloaded first portion of the first information is reproduced regardless of whether or not the first portion of the second information is preloaded. And, the first portion of the second information is not reproduced, if it is loaded after a first time has lapsed from time of production of the first portion of the first information. Alternatively, only the first information may be reproduced in response to a first mode being activated. Accordingly, the first information is reproduced in the foreground, while the second information is loaded in the background. And, a first portion of the first information is reproduced in the foreground while a second portion of the first information is loaded in the background.

In accordance with yet another embodiment, a system for reproducing information stored on a data recording medium is provided. The system is connected to a remote content provider via a communication network, the system comprises means for preloading first information stored on the data recording medium into a temporary storage medium for reproduction; means for determining if second information associated with the first information is available on the remote content provider connected to the communication network; and means for reproducing the first information and the second information, if any, wherein the second information is complementary to the first information to provide an enhanced presentation to a user.

The second information may be located on the remote content provider based on reference information stored on the data recording medium. The reproducing of the first information begins after a first portion of the first information is loaded into the temporary storage medium. In one embodiment, the first portion of the first information comprises approximately all of the first information. In another embodiment the first portion of the first information comprises less than all of the first information, wherein the second information is loaded into the temporary storage medium while the first information is reproduced.

In accordance with one or more embodiments of the invention, a reproduction engine for reproducing A/V data stored on an interactive DVD comprises a navigator connected to a temporary data storage unit for loading A/V data from the interactive DVD into a first section of the temporary data storage unit, and for loading enhanced data associated with the A/V data into a second section of the temporary data storage unit; a decoder for decoding the A/V data and the enhanced data loaded into the temporary data storage unit; and a presentation engine for reproducing the decoded A/V data and the enhanced data in a synchronous manner in accordance with control information stored on the interactive DVD.

The enhanced data is downloaded from a remote content provider based on reference data stored on the interactive DVD. The reproducing of the A/V data begins after a first chapter of the A/V data is loaded into the temporary storage medium. The enhanced data is loaded into the temporary storage medium before and after start of production of the first chapter of the A/V data and the A/V data is reproduced seamlessly regardless of whether the enhanced data is loaded in the temporary storage medium. In some embodiments, the enhanced data is not reproduced, unless all the enhanced data is loaded into the temporary storage medium.

In some embodiments, the enhanced data is reproduced in along with the A/V data, unless a time T has lapsed or unless a first option has been activated. Accordingly, data is reproduced in foreground, while enhanced data is loaded into the temporary storage medium in background.

In accordance with one or more embodiments, an interactive data recording medium comprises a first data recording section for storing presentation data; a second data recording section for storing enhanced data; and a third data recording section for storing control and reference data for loading the presentation data and the enhanced data and for downloading the enhanced data from a remote content provider on a communication network, such that the presentation data and the enhanced data can be reproduced in a synchronized manner, when loaded. The interactive data recording medium may be an optical disk or an enhanced DVD.

In accordance with yet another embodiment of the invention, a directory structure for an interactive data recording medium comprises a first directory for providing reference to presentation data recorded on an interactive recording medium; a second directory for providing reference to enhanced data recorded on the interactive recording medium; and a third directory for providing reference to control data for loading the presentation data and the enhanced data and for downloading the enhanced data from a location on a communication network, such that the loaded presentation data and enhanced data can be reproduced in a synchronized manner. The directory structure may further comprise a root directory, wherein at least one of the first, second, and third directories are positioned under the root directory.

In accordance with another embodiment, a method for reproducing content stored on an interactive data recording medium, wherein the content comprises at least a first chapter and a second chapter, and wherein first remote data is associated with the first chapter and second remote data is associated with the second chapter, comprises reproducing the first chapter and the first remote data, while downloading the second remote data; and reproducing the second chapter and the second remote data, seamlessly after reproduction of the first chapter is completed, if downloading the second remote data is completed.

In one embodiment, the system waits for a time period before reproducing the second chapter so that downloading of the second remote data is completed. In another embodiment, the system cancels reproduction of the second remote data, if the second remote data is not downloaded completely when reproduction of the first chapter is completed. In some embodiments, the system reproduces the second chapter seamlessly after reproduction of the first chapter is completed; and continues downloading the second remote data, if downloading of the second remote data is not completed. And finally, in some embodiments, the system reproduces portions of the second remote data, as downloaded in real-time, along with unreproduced portions of the second chapter.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

FIGS. 4a through 4d illustrate various data reproduction modes, in accordance with one or more embodiments of the invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENT

Figure 1:
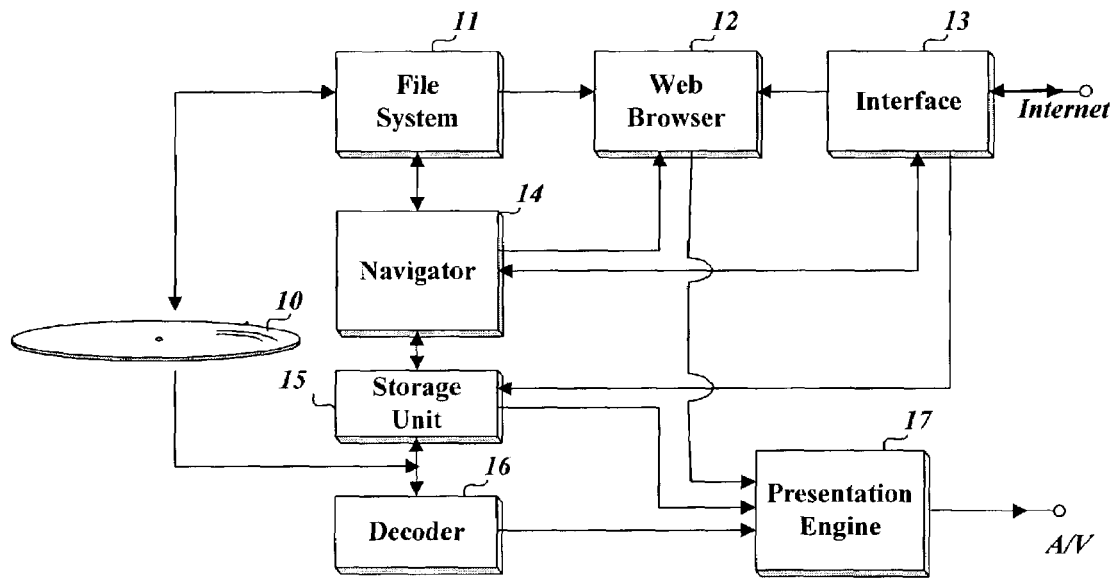
FIG. 1 is a block diagram of a reproduction engine for reproducing A/V information stored on an interactive DVD disk in accordance with one embodiment of the invention.

Referring to FIG. 1, the system of the present invention, in accordance with one embodiment, is implemented to reproduce audiovisual (A/V) data stored on a content disk 10. A/V data may comprise DVD video data, image data, audio data, text, or other forms of information. The content disk 10 in addition to A/V data may contain enhanced navigation (ENAV) or control data to provide an interactive reproduction device (e.g., ENAV player or I-DVD player) with instruction on how to reproduce the A/V data or to provide additional information to be played with the A/V data. Hereinafter, the terms ENAV or I-DVD are used interchangeably and shall refer to an interactive DVD system.

Please note that, for the purpose of simplicity and efficiency, throughout the application, the system of the present invention has been described in association with an "I-DVD" disk or "I-DVD" player. This association, however, is by way of example and should not be construed as limiting the invention to the particular embodiments disclosed. As such, alternative recording mediums or players are within the scope of the invention.

An I-DVD player, in accordance with one or more embodiments of the invention, comprises a DVD reproduction engine and an enhanced navigation or interactive (I-DVD) reproduction engine. The DVD reproduction engine is utilized in association with the I-DVD reproduction engine to reproduce A/V data stored on the I-DVD disk, in accordance with the enhanced navigation data stored on the I-DVD disk.

In some embodiments, the I-DVD engine of the system comprises a file system 11, a web browser 12, an interface 13, a navigator 14, a storage unit 15, a decoder 16, a presentation engine 17, and a controller (not shown). The web browser 12 and interface 13 provide network management services for connecting the I-DVD player to a communication network such as the Internet, and also to support enhanced user interface and to handle user interaction with the system. The file system 11 and navigator 14 act together to load, parse, and interpret digital data loaded from disk 10 for decoding purposes. The controller is utilized to process enhanced navigation data and the interface between the DVD engine and the I-DVD engine, and to control the system elements in response to a user request, for example.

The decoder 16 is utilized for decoding digital data read from disk 10, for example. The presentation engine 17 processes decoded A/V data to provide an A/V output to a display terminal, for example. File system 11 is provided for conducting file management (e.g., searching and reading recorded files, such as a disk information file, a setup file, and a sync data file), for example. Web browser 12 includes a web surfing function and is able to set up presentation environment for reproduction of A/V data, for example.

Storage unit 15 may be any type of data storage medium such as flash memory or a hard drive for storing files uploaded from disk 10 or files downloaded from a communication network to which the system is connected. Storage unit 15 can be cache memory or a buffer for temporary storage of information, for example, and may be implemented in RAM, ROM, EEPROM, a hard disk or other type of storage medium.

The navigator 14, the file system 11, and the web browser 12 represent logical units and may be implemented in form of software, hardware, or a combination of the two. In some embodiments, some or all of the logical units and components illustrated in FIG. 1 may be implemented in one or more integrated logic chips such as Field Programmable Gate Arrays (FPGAs) or Application Specific Integrated Circuits (ASICs).

Figure 2:
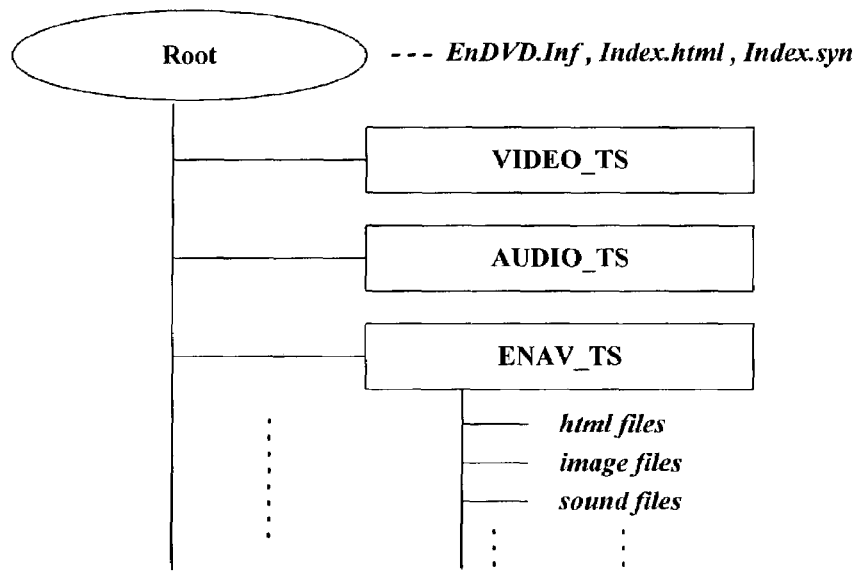
FIG. 2 shows an exemplary directory structure of an interactive DVD file system, in accordance with one embodiment of the invention.

Referring to FIG. 2, in accordance with one or more embodiments of the system, one or more data and/or control files exist or can be implemented under a root directory of the I-DVD disk. A DVD enhanced navigation directory (i.e., DVD_ENAV or ENV_TS) directory may exist, for example, directly under the root directory as shown in FIG. 2. Files including enhanced navigation or other control information and enhanced navigation content files may be placed under the DVD enhanced navigation directory. These files may include html, xml, and A/V content, for example.

In some embodiments, a first file 'EnDVD.Inf', for example, comprises information for reproduction of A/V data recorded on an I-DVD disk 10, a second file 'Index.html', for example, comprises information relating to initial setup for reproduction of A/V data, and a third file 'Index.syn', for example, comprises time information for synchronizing between A/V data and additional data provided through the communication network or a user.

In some embodiments, under the root directory, other subdirectories may be implemented. A directory 'VIDEO_TS', for example, may comprise files of video data. Another directory 'AUDIO_TS', for example, may comprise files of audio data, and a subsequent directory 'ENAV_TS', for example, may comprise additional content files (e.g., 'html' files, 'xml' files, image files, video and audio files).

In one embodiment, the file 'EnDVD.Inf', for example, under the root directory comprises information about a disk version, a content version, a content manufacturer, or a reference address (e.g., URL) for accessing a remote content provider. The remote content provider may provide a variety of contents and content-related information provided by other users connected to the same communication network or new update information that correspond with the A/V data being reproduced at a certain time interval.

The setup file 'Index.html', for example, under the root directory may comprise environment setup information for the web browser 12 and control or navigation information for reproduction of the content stored on I-DVD disk 10. The file 'Index.syn', for example, may comprise time stamp data to synchronize A/V data read from the I-DVD disk 10 with other contents down loaded from a remote content provider, for example.

In some embodiments, the directory 'ENAV_TS', for example, comprises additional contents to be reproduced or outputted in synchronization with A/V data. Additional contents provided from a remote content provider may be also stored under the directory 'ENAV_TS', for example. The additional contents may comprise html or xml files, image files, sound files, and video files, for example. It is noteworthy that the file and directory names and the particular data structures disclosed here with reference to the A/V and enhanced navigation data are for the purpose of example. As such, other names and different or equivalent directory structures and formats may be implemented or used that would accomplish the objectives of the present invention in the same manner to perform the same function and to obtain the same results, without limiting the scope of the invention.

Figure 3A:
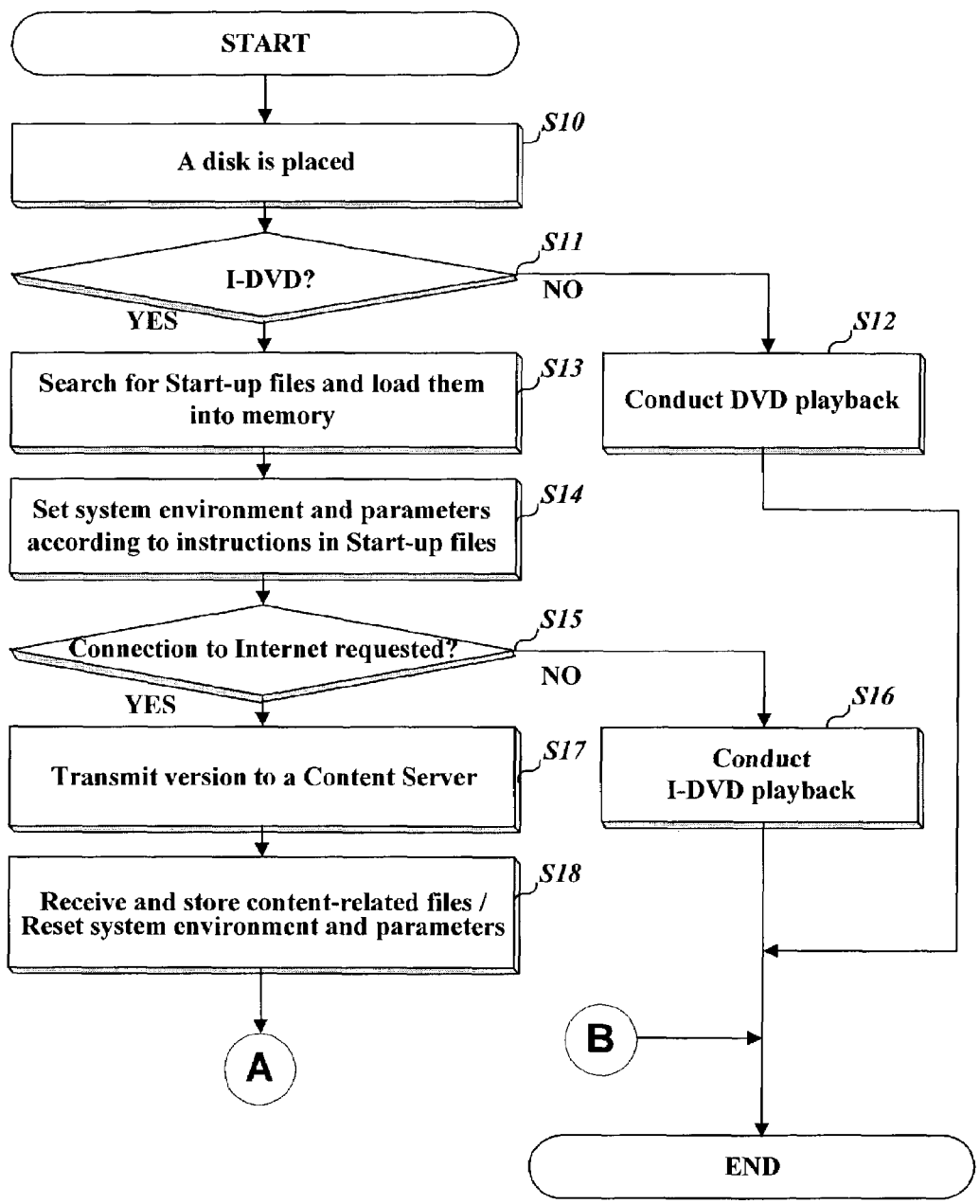
FIGS. 3a and 3b are flow diagrams illustrating a method of reproducing A/V information using an interactive reproduction device, in accordance with one embodiment of the invention.
Figure 3B:
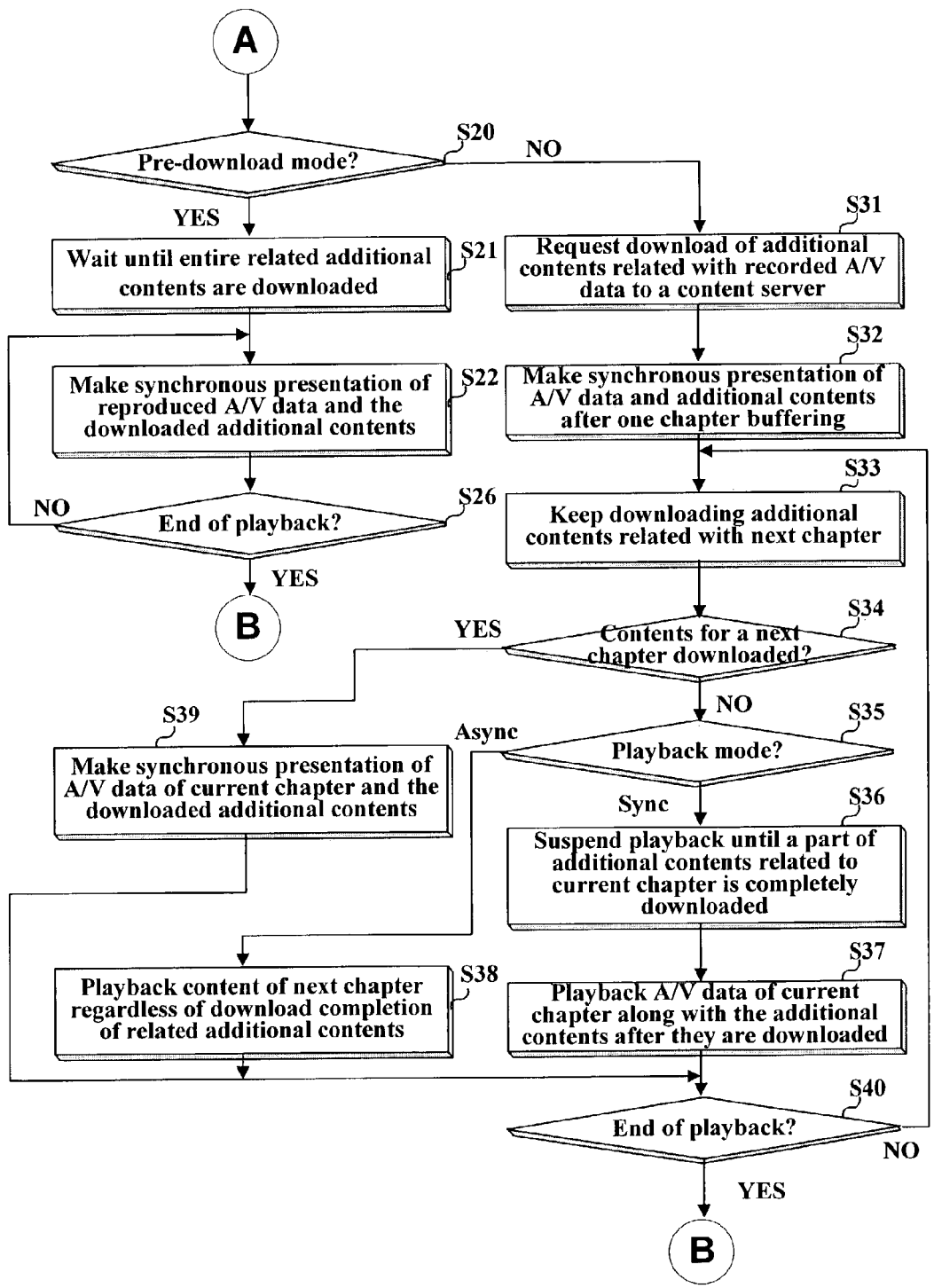

Referring to FIGS. 3a and 3b, if the disk placed in the system is a conventional DVD disk, the navigator 14 conducts a DVD playback operation to reproduce the content on the DVD disk (S12). If the disk is an I-DVD disk, the navigator 14 controls the file system 11 to load startup files (e.g., 'Index.html' and 'Index.syn') under the root directory, for example, into the storage unit 15 (S13).

The navigator 14 interprets the start up file 'Index.html', for example, with the assistance of the web browser 12 and sets up system environment and parameters of the web browser 12 (S14) that has an Internet surfing function and specifies presentation modes of A/V data based on, for example, user input or other criteria. In one embodiment, for example, the user may interact with the system to indicate certain preferred modes of reproduction, for example. Such reproduction modes may include a preload or real-time reproduction mode.

After completion of the startup settings, the navigator 14 checks whether there is an Internet-connection request from a user (S15). If there is no request, a ROM-based reproduction is conducted under condition of the present settings (S16). In the ROM-based reproduction, the contents included under the directory 'ENAV_TS', for example, are synchronously reproduced with the A/V data stored on the I-DVD disk 10 in accordance with time or control information stored in the sync file 'Index.syn'.

In a ROM-based reproduction, the entire content needed for reproduction of the A/V and the ENAV data is present on the I-DVD disk 10. As such, the system pre-loads all or most of the A/V or ENAV data needed for reproduction into storage unit 15 to allow for seamless reproduction of A/V and ENAV data. Depending on implementation, in certain embodiments, the storage unit 15 may be a buffer memory for storing certain portions of the data. The buffer, in one embodiment, is sufficiently large to store all or at least part of the ENAV data associated with an application or a chapter of an A/V data for seamless reproduction.

The advantage of preloading the entire ENAV data associated with an application or a chapter is that the entire content loaded into the buffer can be reproduced seamlessly without having to reload the buffer for additional data. As such, the reproduction is without disruption or apparent delay. If additional or new ENAV is needed for the reproduction of data already loaded into the buffer, then seamless reproduction may not be possible.

In certain embodiments, the buffer is divided into separate areas for storing A/V data (e.g., movies, music, etc.) and ENAV data (e.g., additional images, texts, animations, fonts, sounds, instant messages, etc. associated with the A/V data). To promote the seamless reproduction, the area dedicated to A/V data may vary in size to accommodate the loading of the needed portion of data to be played back. As will be discussed in further detail below, a user may be given the option to turn-off ENAV reproduction, thus allowing the entire buffer to be used for loading A/V data.

If a connection to the Internet is requested (S15), then additional data associated with the content already stored on the I-DVD disk 10 may be downloaded for reproduction. The additional data may include update information or newer versions of data stored on I-DVD disk 10. To download the additional information, in one embodiment, the navigator 14 reads a URL included in the file 'EnDVD.Inf', for example, under the root directory, and controls the web browser 12 and the interface 13 to make a connection to the remote content provider addressed by the URL.

When a connection is made, the version information included in the file 'EnDVD.Inf', for example, is transmitted to the remote content provider along with a download request for a setup and a sync file associated with the data that is to be played back (S17). The remote content provider searches a database, for example, for the files 'Index.html' and 'Index.syn' for the latest contents that are associated with the forwarded version information. If found, the remote content provider transmits the files to the I-DVD player.

The navigator 14 receives the files and interprets the 'Index.html' file, for example, for the latest version with help of the web browser 12 and resets the system environment for A/V data reproduction (S18). The received sync file 'Index.syn', for example, is buffered in the storage unit 15 in accordance to buffering procedures discussed earlier.

Referring to FIG. 3b, once the start up and resetting procedures illustrated in FIG. 3a are finalized, a user can select a download mode. In a first mode, for example, additional contents associated with the A/V data stored on the I-DVD 10 is downloaded from the remote content provider before playing the A/V data. In a second mode, the additional data is downloaded concurrently while A/V data is being played.

If a user selects the former mode, or the 'pre-download' mode (S20), the navigator 14 first requests the download of additional contents from the remote content provider and waits until the additional contents are downloaded. The downloaded additional contents are buffered in the storage unit 15, in accordance with one embodiment (S21).

After downloading the additional contents is completed, the navigator 14 conducts synchronous reproduction of A/V data and the corresponding portions of the downloaded contents with reference to the sync information included in the file 'index.syn', for example (S22). This synchronous reproduction is seamlessly conducted until the end of recorded A/V data is reached (S26). Once the initial reproduction is completed (e.g., after the first chapter of a DVD movie is played), then the additional contents associated with the next reproduction (e.g., the second chapter) are downloaded from the remote content provider for another seamless reproduction.

As an alternative to the pre-download mode, a user may select the 'real-time download' mode. In this mode, after the navigator 14 requests the download of additional contents associated with recorded A/V data from the remote content provider (S31), the navigator 14 does not wait until all additional contents are downloaded. Instead, as soon as a first portion of the additional contents (e.g., an additional content segment related with a first chapter of recorded A/V data) is downloaded, the navigator 14 starts to play the recorded A/V data (S32) in accordance with sync information included in the file 'index.syn', for example. Since in this mode the additional or new content is being download in real-time (i.e., while the A/V and ENAV data are being reproduced) system resources may not be able to download the additional data fast enough to guarantee a seamless reproduction.

Figure 4A:
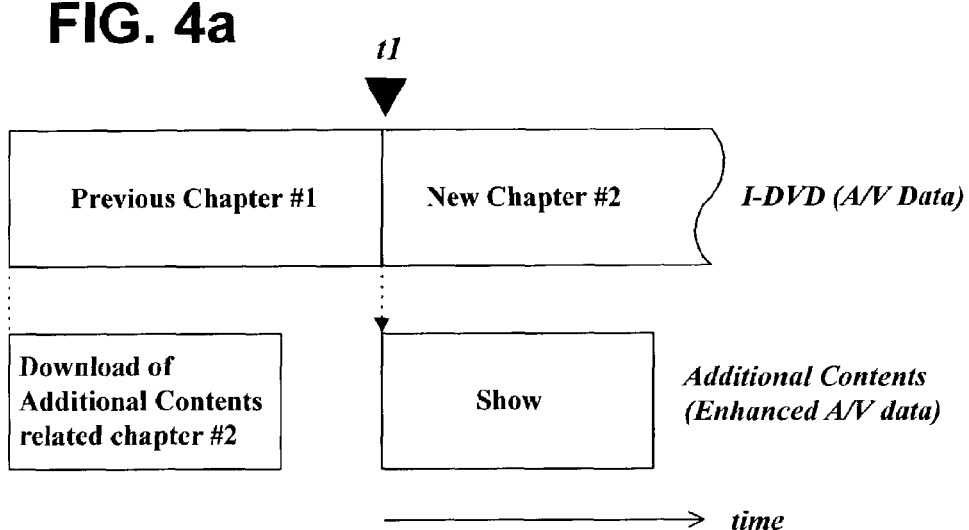

As such, in the seamless mode, while the first chapter (or a first portion) of a presentation is being played, the new additional contents associated with the next chapter (or next portion) of the presentation is downloaded and buffered into the storage unit 15 (S33). If a portion of additional contents related with the next chapter, for example, has been downloaded at t1, when reproduction of the first chapter ends (S34), the A/V data of the next chapter and the corresponding additional contents are reproduced together, as shown in FIG. 4a (S39).

For example, if a user is watching a motion pictured with Chapters 1, 2 and 3 stored on the I-DVD disk, then in the real-time download mode, the system first starts preloading a first portion of additional content (e.g., ENAV or I-DVD data) associated with Chapter 1 (e.g., A/V data) from the I-DVD disk. Alternatively, said additional content may be preloaded from a remote content provider. Once the said first portion is buffered, then the system starts playing Chapter one along with any associated content in the buffer.

In the background, the system continues to preload subsequent portions of additional content from the disk or the remote content provider, while a portion of chapter 1 and the respective preloaded portion associated with chapter 1 are played in the foreground. Due to system constraints and limitation, data reproduction may not be seamless while background pre-loading takes place. However, once the entire ENAV data associated with Chapter 1, for example, is preloaded into the buffer, the user will experience seamless reproduction.

Sometimes, the additional content associated with the next chapter that is ready for reproduction may not be immediately available for reproduction (S34). If so the navigator 14 refers to the setup file 'index.html', for example, to determine which reproduction mode is active (S35).

Figure 4B:
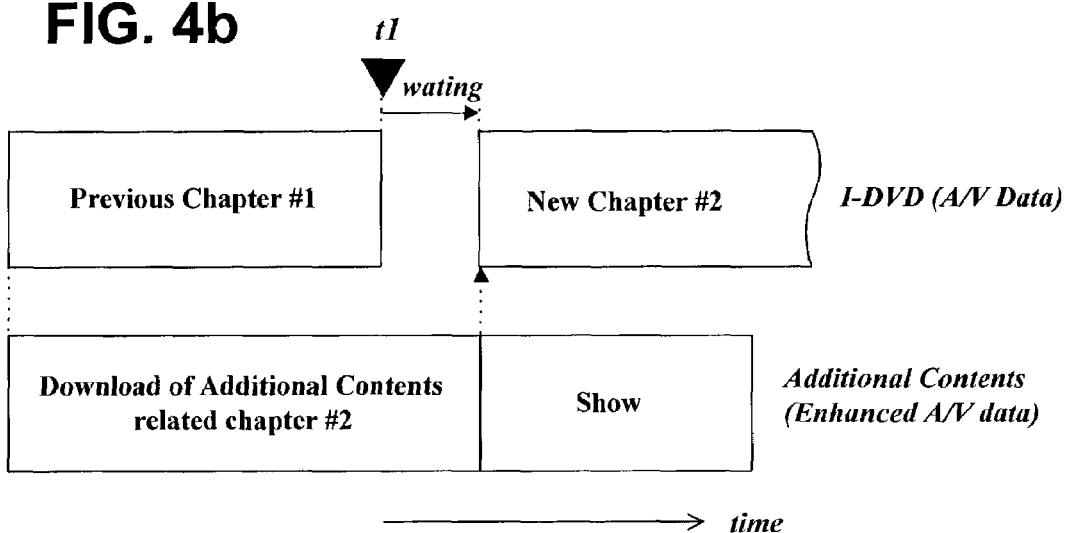

If the setup file 'index.html' is indicative of 'synchronous mode', the reproduction of the next chapter is suspended until the additional contents corresponding to the next chapter is downloaded from the remote content provider (S36). After completion of the download, the next chapter is reproduced along with the downloaded additional contents (S37), as shown in FIG. 4b. In some embodiments, a user may terminate the suspended state while waiting for download completion. If so, the next chapter data is reproduced immediately regardless of download completion of the related additional contents.

If the setup file 'index.html' is indicative of 'asynchronous mode', the navigator 14 starts to play the next chapter data regardless of download completion of related additional contents (S38), without suspending data reproduction. Referring to FIG. 4c, in one embodiment, whether or not the additional content become available or not, the system continues to play the next chapter data and skips any downloaded additional content. Referring to FIG. 4d, in another embodiment, the system continues to play the next chapter data, and as additional content is downloaded and is ready for reproduction, the additional content is also played. Those portions of the additional content that are not timely downloaded, however, are skipped to prevent a choppy or discontinued reproduction.

In certain embodiments, the setup file 'index.html', for example, specifies the 'play mode' in accordance with the following exemplary syntax:

"ELEMENT: <PLAYBACK>
ATTRIBUTE:
defaultState—TRUE/FALSE
synchronized—TRUE/FALSE"

If defaultState="FALSE", for example, 'pre-download' mode is selected. Otherwise, 'realtime-download' mode is selected. If a user does not set the download mode, related additional contents are downloaded as indicated in the setup file 'index.html', for example.

If defaultState="TRUE" and synchronized="TRUE", then 'realtime-download' mode and 'synchronous' play mode are selected and A/V data playing operation is conducted as illustrated in FIG. 4b.

If defaultState="TRUE" and synchronized="FALSE", then 'realtime-download' mode and 'asynchronous' play mode are selected and the A/V data playing operation is conducted as illustrated in FIG. 4c or 4d.

As such, a system and method for the synchronous reproduction of local and remote data in a networked environment is provided. While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method of reproducing information stored on a data recording medium using a reproduction device in communication with a communication network, the method comprising:

retrieving first information stored on the data recording medium for reproduction;

determining if second information associated with the first information is available for retrieval from a remote content provider in communication with the communication network;

retrieving the second information in response to control information; and reproducing the first information and the second information in accordance with the control information, such that the first information is reproduced at least during one of a first period and a second period, wherein the first period is a time period during which the second information is being retrieved and the second period is a time period after the retrieval of the second information is completed, wherein the first information is reproduced in the foreground, while the second information is retrieved in the background.

2. The method of claim 1, wherein the second information is reproduced based on reference information stored on the data recording medium.

3. The method of claim 1, wherein the reproducing of the first information begins after a first portion of the first information is retrieved.

4. The method of claim 3, wherein the first portion of the first information comprises approximately all of the first information.

5. The method of claim 3, wherein the first portion of the first information comprises less than all of the first information, said method further comprising retrieving the second information while the first information is reproduced.

6. The method of claim 5, wherein the first and second information are retrieved into a temporary storage medium divided into at least a first section and a second section, such that the first information is retrieved into the first section and the second information is retrieved into the second section of the temporary storage medium.

7. The method of claim 5, wherein the first information is reproduced regardless of what portion of the second information has been retrieved.

8. The method of claim 7, wherein the reproduction device does not start reproducing the second information, unless all the second information is retrieved.

9. The method of claim 7, wherein the second information is reproduced along with the first information, in real time, as the second information is being retrieved.

10. The method of claim 9, wherein if a first portion of the second information associated with a first portion of the first information is retrieved after a predetermined time period has lapsed, then the first portion of the second information is discarded.

11. The method of claim 1,
wherein the first information comprises at least first and second portions and the second information comprises at least first and second portions, respectively associated with the first and second portions of the first information,
wherein the first portion of the first information and the first portion of the second information are pre-retrieved, such that said pre-retrieved first portions can be played seamlessly before said second portions are retrieved.

12. The method of claim 11, wherein at least a part of the second portion of the first information is retrieved while said pre-retrieved first portions of the first information and the second information are reproduced.

13. The method of claim 11, wherein the second portion of the first information is not retrieved until the first pre-retrieved portions of the first information and the second information have been substantially reproduced.

14. The method of claim 11, wherein the pre-retrieved first portion of the first information is reproduced regardless of whether or not the first portion of the second information is pre-retrieved.

15. The method of claim 14, wherein the first portion of the second information is not reproduced if it is retrieved after a predetermined time has lapsed from time of production of the first portion of the first information.

16. The method of claim 14, wherein only the first information is reproduced in response to a first mode being activated.

17. The method of claim 1, wherein a first portion of the first information is reproduced in the foreground, while a second portion of the first information is retrieved in the background.

18. A system for reproducing information stored on a data recording medium, the system in communication with a remote content provider via a communication network, the system comprising:
   a navigation unit;
   a presentation device operatively connected to the navigation unit, the presentation device configured to
      preload first information stored on the data recording medium into a temporary storage medium for reproduction;
      determine if second information associated with the first information is available on the remote content provider;
      load the second information in response to control information; and
      reproduce the first information and the second information, in accordance with the control information, such that the first information is reproduced at least during one of a first period and a second period,
      wherein the first period is a time period during which the second information is being loaded and the second period is a time period after the loading of the second information is completed, and
      wherein the first information is reproduced in foreground, while the second information is loaded into the temporary storage medium in background.

19. The system of claim 18, wherein the second information is located on the remote content provider based on reference information stored on the data recording medium.

20. The system of claim 18, wherein the presentation device is configured to reproduce the first information begins after a first portion of the first information is loaded into the temporary storage medium.

21. The system of claim 20, wherein the first portion of the first information comprises approximately all of the first information.

22. The system of claim 20, wherein the first portion of the first information comprises less than all of the first information, wherein the second information is loaded into the temporary storage medium while the first information is reproduced.

23. The system of claim 22, wherein the temporary storage medium is divided into at least a first section and a second section, such that the first information is loaded in to the first section and the second information is loaded into the second portion of the temporary storage medium.

24. The system of claim 22, wherein the first information is reproduced regardless of whether the second information has been loaded into the temporary storage medium.

25. The system of claim 24, wherein the second information is not reproduced, unless all the second information is loaded into the temporary storage medium.

26. A reproduction device of a A/V data reproduction device for reproducing A/V data stored on an interactive DVD, the reproduction device comprising:
   a navigator in communication with a temporary data storage unit, configured to load A/V data from the interactive DVD into a first section of the temporary data storage unit, and to load enhanced data associated with the A/V data into a second section of the temporary data storage unit;
   a decoder configured to decode the A/V data and the enhanced data loaded into the temporary data storage unit; and
   a presentation device configured to reproduce the decoded A/V data and the enhanced data, in accordance with control information stored on the interactive DVD, such that the A/V data is reproduced at least during one of a first period and a second period, wherein the first period is a time period during which the enhanced data is being loaded and the second period is a time period after the loading of the enhanced data is completed,
   wherein the enhanced data is downloaded from a remote content provider in communication with the reproduction device via a communication network based on reference data stored on the interactive DVD, and
   wherein the A/V data is reproduced in foreground, while the enhanced data is loaded into the temporary storage medium in background.

27. The reproduction device of claim 26, wherein the reproducing of the A/V data begins after a first chapter of the A/V data is loaded into the temporary storage medium.

28. The reproduction device of claim 27, wherein the enhanced data is loaded into the temporary storage medium before and after start of production of the first chapter of the A/V data.

29. The reproduction device of claim 27, wherein the A/V data is reproduced seamlessly regardless of whether the enhanced data is loaded in the temporary storage medium.

30. The reproduction device of claim 28, wherein the enhanced data is not reproduced, unless approximately all the enhanced data is loaded into the temporary storage medium.

31. The reproduction device of claim 28, wherein the enhanced data is reproduced in synchronization with the A/V data, unless a time T has lapsed.

32. The reproduction device of claim 28, wherein the enhanced data is reproduced along with the A/V data, unless a first option has been activated.

33. An interactive data recording medium configured to be read by an A/V data reproduction device, comprising:
   a first data recording section for storing presentation data;
   a second data recording section for storing enhanced data; and
   a third data recording section for storing control and reference data utilized by a reproduction device for retrieving the presentation data and the enhanced data from a remote content provider in communication with a corresponding interactive data reproduction device via a communication network, such that the presentation data is reproduced by the reproduction device at least during one of a first period and a second period,
   wherein the first period is a time period during which the enhanced data is being retrieved and the second period is a time period after the retrieval of the enhanced data is completed, and wherein the presentation data is reproduced in foreground, while the enhanced data is loaded into the second data recording section in background.

34. An interactive data recording medium configured to be read by an A/V data reproduction device, comprising:
a first directory for providing reference to presentation data recorded on the interactive data recording medium;
a second directory for providing reference to enhanced data recorded on the interactive recording medium; and
a third directory for providing reference to control data for retrieving the presentation data and the enhanced data from a remote content provider connected to a communication network, such that the retrieved presentation data is reproduced at least during one of a first period and a second period,
wherein the first period is a time period during which the enhanced data is being retrieved and the second period is a time period after the retrieval of the enhanced data is completed, and
wherein the presentation is reproduced in the foreground, while the enhanced is retrieved in the background.

35. The interactive data recording medium of claim 34, further comprising a root directory.

36. The interactive data recording medium of claim 34, wherein at least one of the first, second, and third directories are positioned under the root directory.

37. A method of reproducing content stored on an interactive data recording medium, wherein the content comprises at least a first chapter and a second chapter, and wherein first remote data is associated with the first chapter and second remote data is associated with the second chapter, the method comprising:
downloading and buffering the first remote data from a remote server via a network;
simultaneously reproducing the first chapter and the first remote data, while downloading the second remote data from the remote server; and
simultaneously reproducing the second chapter and the second remote data after reproduction of the first chapter is completed and when downloading the second remote data is completed,
the step of simultaneously reproducing the second chapter and the second remote data including:
waiting for a predetermined time period before reproducing the second chapter so that downloading of the second remote data is completed, and
cancelling reproduction of the second remote data, if the second remote data is not downloaded completely when reproduction of the first chapter is completed.

38. The method of claim 37, further comprising:
reproducing the second chapter seamlessly after reproduction of the first chapter is completed; and
continuing downloading the second remote data, if downloading of the second remote data is not completed.

39. The method of claim 38, further comprising:
reproducing portions of the second remote data, as downloaded in real-time, along with unreproduced portions of the second chapter.

40. A method, by an A/V data reproduction device in communication with a communication network, of reproducing content stored on an enhanced navigation data recording medium, the method comprising:
determining if a data recording medium is an enhanced navigation data recording medium;
determining if a first mode for activating an enhanced navigation feature is selected;
reading setup information stored on the enhanced navigation data recording medium and retrieving control information from the setup information;
determining, based on the retrieved control information, if content information is available, wherein the content information includes first content information stored on the enhanced navigation data recording medium and second content information associated with the first content information stored on a remote content provider in communication with the communication network;
retrieving the second content information in response to the control information from the remote content provider; and
reproducing the first content information and the second content information, in accordance with the control information, such that the first content information is reproduced at least during one of a first period and a second period,
wherein the first period is a time period during which the second content information is being retrieved and the second period is a time period after the retrieval of the second content information is completed, and
wherein the first content information is reproduced in the foreground, while the second content information is retrieved in the background.

41. An interactive data recording medium configured to be read by an A/V data reproducing device and including instructions configured to cause the A/V data reproducing device to perform the following steps:
retrieving first information stored on the data recording medium for reproduction;
determining if second information associated with the first information is available for retrieval from a remote content provider in communication with a communication network;
retrieving the second information in response to control information; and
reproducing the first information and the second information in accordance with the control information, such that the first information is reproduced at least during one of a first period and a second period,
wherein the first period is a time period during which the second information is being retrieved and the second period is a time period after the retrieval of the second information is completed,
wherein the first information is reproduced in the foreground, while the second information is retrieved in the background.

42. An interactive data recording medium configured to be read by an A/V data reproducing device and including instructions configured to cause the A/V data reproducing device to perform the following steps:
determining if a data recording medium is an enhanced navigation data recording medium;
determining if a first mode for activating an enhanced navigation feature is selected;
reading setup information stored on the enhanced navigation data recording medium and retrieving control information from the setup information;
determining, based on the retrieved control information, if content information is available, wherein the content information includes first content information stored on the enhanced navigation data recording medium and second content information associated with the first content information stored on a remote content provider in communication with a communication network;

retrieving the second content information in response to the control information from the remote content provider; and reproducing the first content information and the second content information, in accordance with the control information, such that the first content information is reproduced at least during one of a first period and a second period, wherein the first period is a time period during which the second content information is being retrieved and the second period is a time period after the retrieval of the second content information is completed, and wherein the first content information is reproduced in the foreground, while the second content information is retrieved in the background.

43. An interactive data recording medium configured to be read by an A/V data reproducing device and including instructions configured to cause the A/V data reproducing device to perform the following steps:

downloading and buffering first remote data from a remote server via a network;

simultaneously reproducing a first chapter and the first remote data in the foreground, while downloading a second remote data from the remote server in the background; and simultaneously reproducing a second chapter and the second remote data after reproduction of the first chapter is completed and when downloading the second remote data is completed.

* * * * *